United States Patent [19]

Schmidt

[11] Patent Number: 5,022,846
[45] Date of Patent: Jun. 11, 1991

[54] PNEUMATIC ACTUATING MECHANISM FOR INJECTION MOLDING

[75] Inventor: Harald H. Schmidt, Georgetown, Canada

[73] Assignee: Mold-Masters Limited, Georgetown, Canada

[21] Appl. No.: 399,999

[22] Filed: Aug. 29, 1989

[30] Foreign Application Priority Data

Jul. 14, 1989 [CA] Canada .................................. 605753

[51] Int. Cl.⁵ ........................ B29C 45/22; B29C 45/23
[52] U.S. Cl. ................................. 425/564; 264/328.9; 264/328.15; 425/570; 425/572
[58] Field of Search ............... 425/549, 562, 563, 564, 425/566, 570, 572; 264/328.9, 328.15; 251/327

[56] References Cited

U.S. PATENT DOCUMENTS

| | | | |
|---|---|---|---|
| 4,268,240 | 5/1981 | Rees et al. | 425/549 |
| 4,340,204 | 7/1982 | Herd | 251/327 |
| 4,711,752 | 12/1987 | Deacon et al. | 425/543 |
| 4,740,151 | 4/1988 | Schmidt | 425/549 |

Primary Examiner—Jay H. Woo
Assistant Examiner—Timothy W. Heitbrink
Attorney, Agent, or Firm—Riches, McKenzie & Herbert

[57] ABSTRACT

A multi-cavity valve gates injection molding system. The pneumatic actuating mechanism to reciprocate each elongated valve member includes a piston which reciprocates in a cylindrical opening through a cylinder plate. A sealing bushing which is mounted around each valve member has a flanged portion which bridges an insulative air gap between the manifold and the cylinder plate. Thus, the sealing bushing forms part of the piston cylinder as well as sealing against melt leakage around the reciprocating valve member. The piston has a circumferential outer band formed of a graphite alloy seated in a groove formed between a front portion and a removable rear plate portion.

6 Claims, 3 Drawing Sheets

PNEUMATIC ACTUATING MECHANISM FOR INJECTION MOLDING

BACKGROUND OF THE INVENTION

This invention relates generally to injection molding and more particularly to a valve gated injection molding system having an improved pneumatic valve member actuating mechanism.

Multi-cavity valve gated injection molding systems are well known having a valve member actuating mechanism with a piston which reciprocates in a cylinder mounted in the back plate. While this arrangement has been very satisfactory, it has the disadvantage that it requires a cylinder seated in the back plate and the cylinder requires a high pressure seal to prevent leakage of hydraulic fluid or air around the reciprocating valve pin. As described in the applicant's U.S. Pat. No. 4,740,151 which issued Apr. 26, 1988, it is also known to have a sealing and retaining bushing mounted on the manifold with a flanged portion bearing against the front surface of the back plate around the cylinder. A valve member bushing which is seated in an opening through the manifold and has a flange bridging the air space is shown in Gellert's Canadian patent application Ser. No. 604,608 filed June 30, 1989 entitled "Injection Molding System Having Dual Feed Bushing Seated in Manifold". However, while these previous bushings provided a seal and a containment chamber for leakage of melt past the reciprocating valve member, a separate high pressure seal was required for leakage from the cylinder.

SUMMARY OF THE INVENTION

Accordingly, it is an object of the invention to at least partially overcome the disadvantages of the prior art by eliminating the separate cylinder seated in the back plate and having the sealing bushing seal both against melt leakage and leakage of air from the actuating mechanism cylinder.

To this end, in one of its aspects, the invention provides a multi-cavity valve gated injection molding system having an elongated manifold extending between a cylinder plate having a front surface and a plurality of spaced heated nozzles, each nozzle being seated in a well in a cooled cavity plate and having a central bore extending therethrough in alignment with a gate leading to a cavity, an elongated valve member having a rear end and a forward end mounted in the central bore through the nozzle to extend rearwardly through the manifold, a sealing bushing mounted around each valve member to extend across an air space between the manifold and the cylinder plate, each sealing bushing having a central bore which receives the valve member therethrough and an outer flanged portion which extends into bearing contact against the front surface of the cylinder plate, a pneumatic valve member actuating mechanism mounted in the cylinder plate to engage the rear end of the valve member to drive the valve member between an open position and a closed position wherein the forward end is seated in the gate, and a melt passage which branches from a common inlet and extends through the manifold and around the valve member in the central bore of each nozzle to convey pressurized melt to each gate, the improvement wherein actuating mechanism includes a piston which engages the rear end of the valve member, the piston being mounted to reciprocate in an opening in the cylinder plate, and first and second air ducts extending to the opening in the cylinder plate on opposite sides of the piston, the opening in the cylinder plate having an open forward mouth around which the outer flanged portion of the sealing bushing bears against the front surface of the cylinder plate to prevent air escaping from the opening in the cylinder plate into the air space surrounding the flanged portion of the sealing bushing.

Further objects and advantages of the invention will appear from the following description taken together with the accompanying drawings.

DETAILED DESCRIPTION OF THE DRAWINGS

Figure 1:
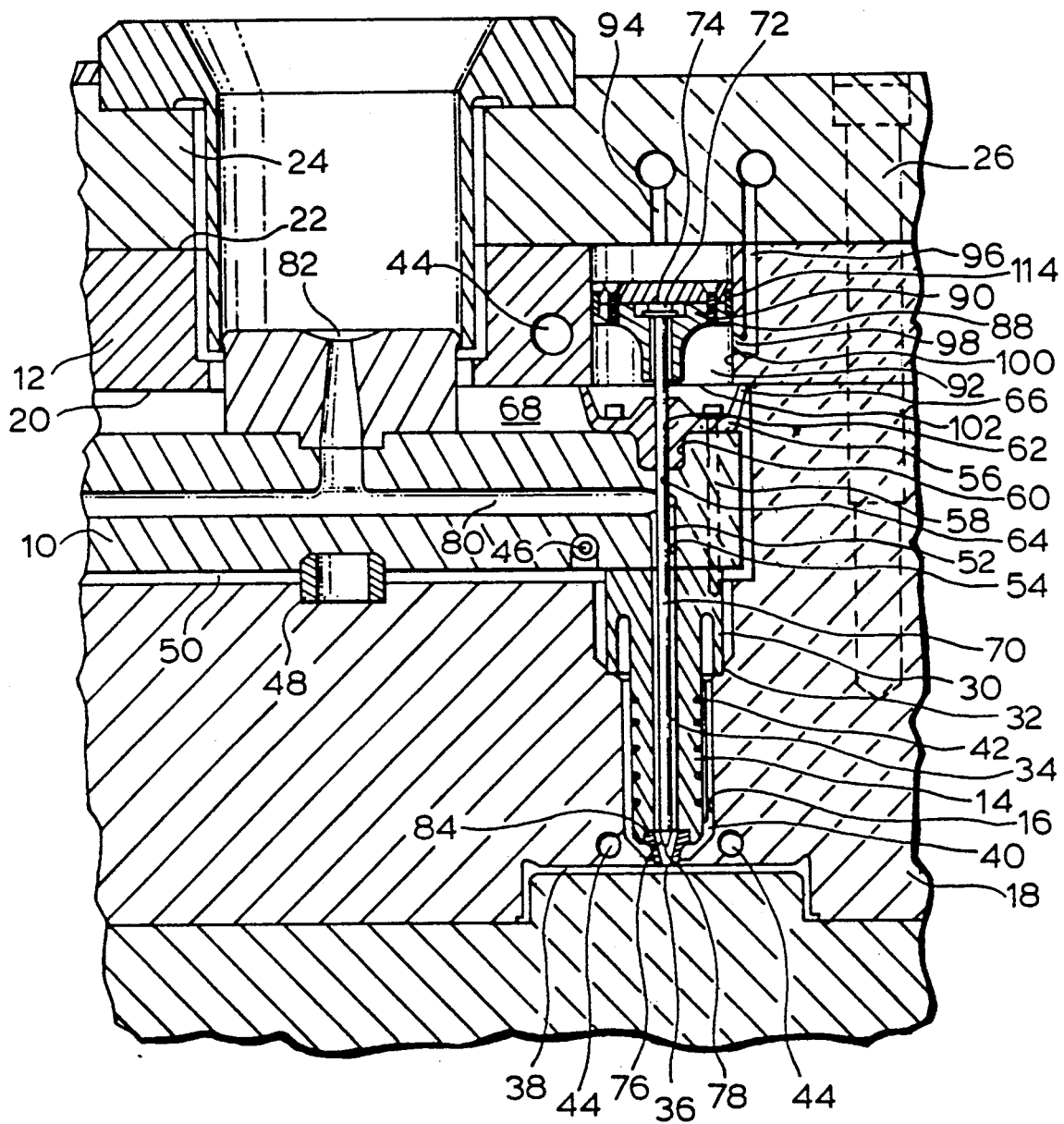
FIG. 1 is a sectional view of a portion of a multi-cavity injection molding system showing the valve member actuating mechanism according to one embodiment of the invention.

Reference is first made to FIG. 1 which shows a portion of multi-cavity valve gated injection molding system having an elongated heated manifold 10 which is securely mounted between a cylinder plate 12 and a number of heated nozzles 14, each of which is seated in a well 16 in a cavity plate 18. The cylinder plate 12 has a front surface 20 and a rear surface 22 against which a back plate 24 is held tightly in place by bolts 26 which extend through the cylinder plate 12 into the cavity plate 18.

Each nozzle 14 has an insulation flange 30 which sits against an inwardly projecting shoulder 32 in the well 16 which locates the nozzle with a central bore 34 in alignment with a gate 36 extending through the cavity plate 18 to a cavity 38. This provides an insulative air space 40 between each nozzle 14 which is heated by a helical electric heating element 42 which is integrally cast into it and the surrounding cooled cavity plate 18. The cavity plate 18 and the cylinder plate 12 are similarly cooled by pumping cooling water through cooling conduits 44. The manifold 10 which is heated by an integral electric heating element 46, is accurately located by a central locating ring 48 which is seated in the cooled cavity plate 18 to similarly have an insulative air space 50 between them.

The elongated manifold 10 has a transverse bore 52 with a larger diameter portion 54 matching the diameter of and extending into alignment with the central bore 34 of each nozzle 14. Steel sealing bushings 56 are secured by bolts 58 in matching seats 60 in the manifold 10. Each sealing bushing 56 has a central bore 62 which matches and extends in alignment with a smaller diameter portion 64 of the transverse bore 52 through the manifold. Each sealing bushing 56 also has an outer flanged portion 66 against which the front surface 20 of the cavity plate 18 bears. As can be seen, the outer flanged portions 66 of the sealing bushings 56 extend across another insulative air space 68 between the heated manifold 10 and the cooled cylinder plate 12. Thus, these insulative air spaces 40, 50, 68 are arranged to provide maximum thermal separation between the heated and cooled components of the system, while at the same time maintaining the structural integrity of the system.

An elongated valve member 70 extends through the aligned bores 34, 52 and 62 of the nozzle 14, manifold 10 and sealing bushing 56. The valve member has an enlarged head 72 at its rear end 74 and a tapered tip 76 at its forward end 78. The valve member 70 fits snugly through the central bore 62 of the sealing bushing 56 and the smaller diameter portion 64 of the transverse bore 52 through the manifold 10 which prevents leakage of the melt as the valve member 70 reciprocates between a retracted open position and a forward closed position in which the tapered tip 76 is seated in the gate 36.

A melt passage 80 branches in the elongated manifold 10 to convey melt received from a molding machine (not shown) at a common inlet 82 to the central bore 34 of each nozzle 14 which leads to a respective cavity 38. As can be seen, the diameter of the central bore 34 of the nozzle 14 is sufficiently larger than the outside diameter of the valve member 70 extending centrally therethrough to form part of the melt passage 80. A nozzle seal 84 is seated in the nose 86 of the nozzle 14 to prevent leakage of the melt into the air space 40.

The rear end 74 of each valve member 70 is engaged by pneumatic actuating mechanism 88 which includes a piston 90 received in a cylindrical opening 92 extending through the cylinder plate 12 from the front surface 20 to the rear surface 22. Air ducts 94, 96 connected to controlled air pressure supplies (not shown) extend from the back plate 24 to the cylindrical opening 92 on opposite sides of each piston 90. As seen in FIG. 1, the air duct 96 which extends through the cylinder plate 12 has a rearwardly directed diagonal portion 98 as it joins the opening 92. This directs the incoming air which has a cooling effect as described in more detail below against the piston 90 rather than against the sealing bushing 56. The opening 92 through the cylinder plate 12 has a cylindrical inner wall 100 and an open forward mouth 102 around which the outer flanged portion 66 of the sealing bushing 56 bears against the front surface 20 of the cylinder plate 12 to prevent air escaping from the opening 92 into the air space 68 surrounding the flanged portion 66 of the sealing bushing 56. In this embodiment, the cylinder opening 92 is closed at the rear end by the back plate 24, but a separate rear cap can be used.

Figure 2:
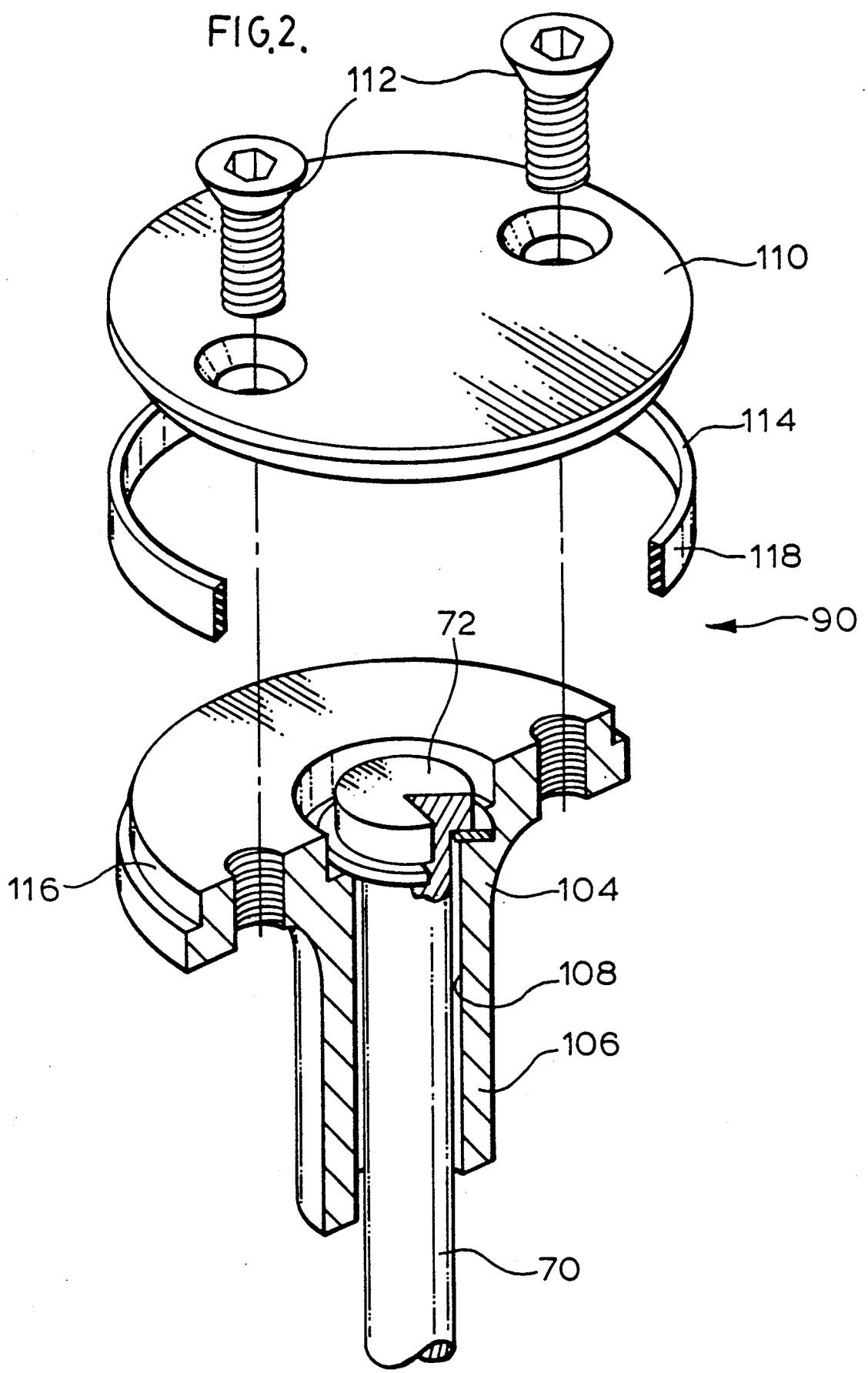
FIG. 2 is an exploded cut-away isometric view showing the assembly of the piston seen in FIG. 1.

As seen in FIG. 2, each piston 90 has a forward portion 104 which has a neck 106 with a center bore 108 to receive the valve member 70 therethrough. The piston 90 also has a rear plate portion 110 which is fastened to the forward portion 104 by screws 112 to engage the head 72 of the valve member 70 between them. Also, a circumferential band 114 formed of a graphite alloy seats in a circumferential groove 116 which is formed when the forward and rear portions 104,110 are jointed together. The graphite alloy band 114 has a rectangular cross-section with an outer surface 118 which is in sliding contact against the inner wall 100 of the cylinder opening 92 as the piston reciprocates.

In use, the system is assembled as shown and electrical power is applied to the heating elements 42,46 to heat the nozzle 14 and manifold 10 to a predetermined operating temperature. Hot pressurized melt is injected from a molding machine (not shown) into the melt passage 80 through the central inlet 82 according to a predetermined cycle. Controlled pneumatic pressure is applied to the cylinder opening 92 through air ducts 94,96 to control actuation of the pistons 90 and valve members 70 according to a predetermined cycle in a conventional manner. When the valve members 70 are in the retracted open position, the pressurized melt flows through the melt passage 80 and the gates 36 until the cavities 38 are full. When the cavities 38 are full, injection pressure is held momentarily to pack. The pneumatic pressure is then reversed to reciprocate the valve member 70 to the forward closed position in which the forward end 78 of each of the valve members 70 is seated in one of the gates 36. The injection pressure is then released and, after a short cooling period, the mold is opened for ejection. After ejection, the mold is closed, pneumatic pressure is applied to retract the valve members 76 to the open position and melt injection pressure is reapplied to refill the cavities 38. This cycle is repeated continuously every few seconds with a frequency depending upon the number and size of the cavities and the type of material being molded. As can be seen, in addition to retaining the manifold 10 and nozzle 14 in place, the force of the cylinder plate 12 against the circular flanged portion 68 of each sealing bushing 56 prevents the air escaping from the cylinder opening 92. Thus, in addition to preventing pressurized melt escaping around the reciprocating valve member 70, each sealing bushing 56 forms part of the cylinder in which the piston 90 is enclosed. As well as reducing costs, this provides the advantage that the air flowing through air duct 96 on the forward side of the piston 90 as the piston reciprocates is in direct contact with the sealing bushing 56 which provides additional cooling and helps to reduce seepage of the melt out around the reciprocating valve member 70. As mentioned above, the diagonal portion 98 of the air duct 96 is directed rearwardly in this embodiment to dissipate the immediate cooling effect of the incoming air somewhat to avoid it being directed to only one side of the sealing bushing 56.

Figure 3:
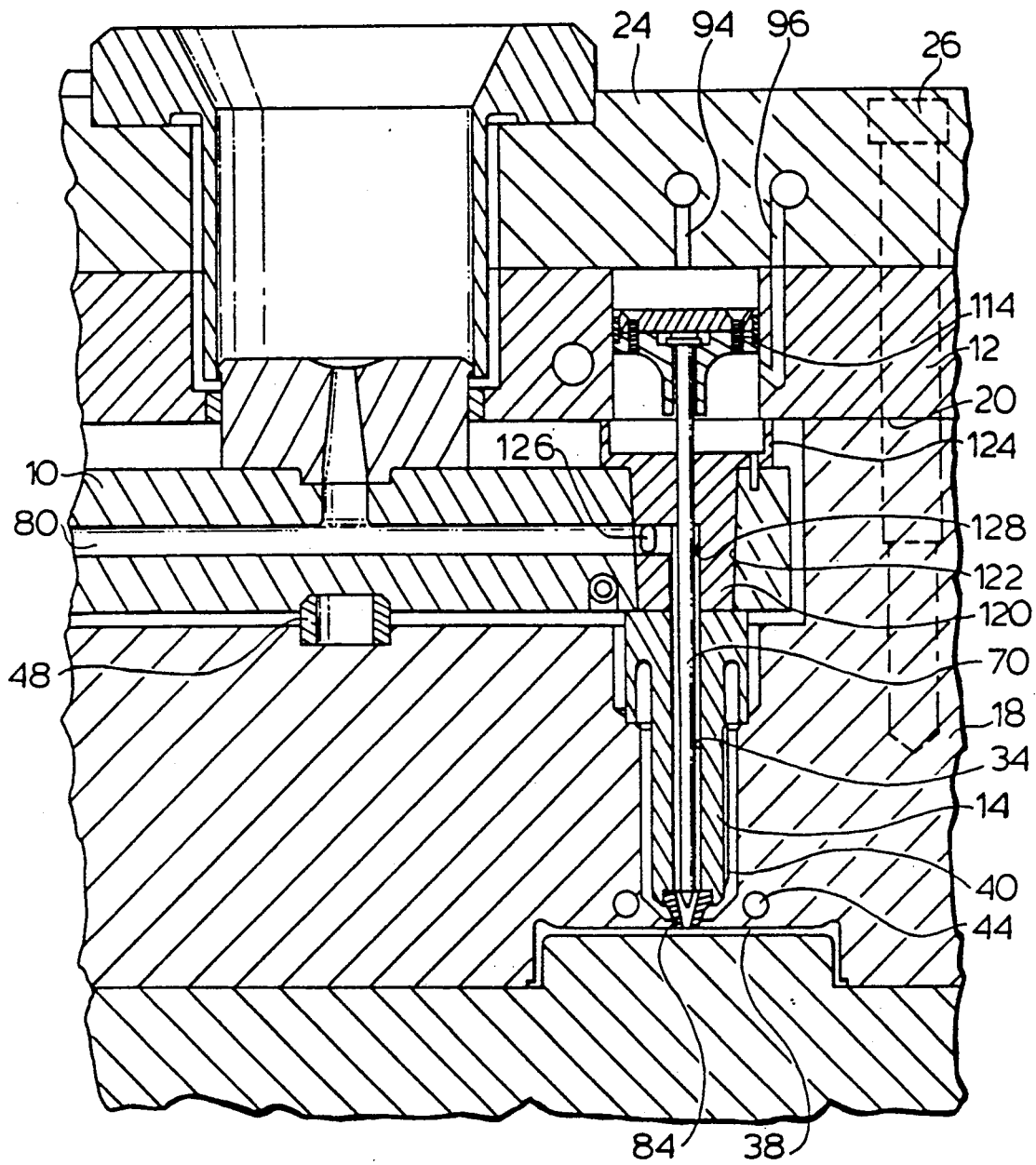
FIG. 3 is a sectional view of an injection molding system according to another embodiment of the invention.

Reference is now made to FIG. 3 which shows an injection molding system according to another embodiment of the invention. As many of the elements are identical to those of the first embodiment described above, elements common to both embodiments are described and illustrated using the same reference numerals. In this embodiment, the sealing bushings bolted to the manifold are replaced by sealing bushings 120 which are seated in openings 122 extending through the manifold as described in Canadian patent application Ser. No. 604,608 referred to above. The sealing bushing 120 also has a flanged portion 124 which extends into bearing contact against the front surface 20 of the cylinder plate 12. Thus, in this embodiment the sealing bushing 120 similarly forms part of the piston cylinder as well as sealing against melt leakage around the reciprocating valve member 70. The operation of this embodiment is the same as that described above except that each sealing bushing 120 has a melt duct 126 which splits into two smoothly curved arms to connect to the central bore 128 through the bushing 120 on opposite sides of the valve member 70, as described in detail in Canadian patent application Ser. No. 604,608 referred to above.

While the description of the injection molding system has been given with respect to preferred embodiments, it is not to be construed in a limiting sense. Variations and modifications will occur to those skilled in the art. Reference is made to the appended claims for a definition of the invention.

What I claim is:

1. In a multi-cavity valve gated injection molding apparatus having an elongated manifold extending between a cylinder plate having a front surface and a rear surface and a plurality of spaced heated nozzles, each nozzle being seated in a well in a cooled cavity plate and having a central bore extending therethrough in alignment with a gate leading to a cavity, an elongated valve member having a rear end and a forward end mounted in the central bore through the nozzle to extend rearwardly through the manifold, a sealing bushing mounted around each valve member to extend across an air space between the manifold and the cylinder plate, each sealing bushing having a central bore which receives the valve member therethrough and an outer flanged portion which extends into bearing contact against the front surface of the cylinder plate, a pneumatic valve member actuating mechanism mounted in the cylinder plate to engage the rear end of the valve member to drive the valve member between an open position and a closed position wherein the forward end is seated in the gate, and a melt passage which branches from a common inlet and extends through the manifold and around the valve member in the central bore of each nozzle to convey pressurized melt to each gate, the improvement:

wherein the valve member actuating mechanism includes a piston which engages the rear end of the valve member, the piston being mounted to reciprocate in a cylindrical opening extending through the cylinder plate from the rear surface to the front surface, and first and second air ducts extending to the cylindrical opening through the cylinder plate on opposite sides of the piston, the cylindrical opening through the cylinder plate having an open forward mouth, the outer flanged portion of the sealing bushing bearing against the front surface of the cylinder plate around the open forward mouth of the cylindrical opening whereby the flanged portion is outside the open mouth of the cylindrical opening to prevent air escaping from the opening in the cylinder plate into the air space surrounding the flanged portion of the sealing bushing, and a back plate is securely mounted against the back surface of the cylinder plate to enclose the cylindrical opening.

2. An injection molding apparatus as claimed in claim 1 wherein each piston has a circumferential outer band formed of a graphite alloy which seals against the inner wall of the opening in the cylinder plate as the piston reciprocates.

3. An injection molding apparatus as claimed in claim 2 wherein the rear end of each valve member has an enlarged head, and each piston has a rear plate portion removably secured to a forward portion to engage the enlarged head of the valve member therebetween and to form a circumferentially extending groove therebetween in which the circumferential band is seated.

4. An injection molding apparatus as claimed in claim 1 wherein each sealing bushing is attached to the manifold.

5. An injection molding apparatus as claimed in claim 1 wherein each sealing bushing is seated in an opening extending through the manifold.

6. An injection molding apparatus as claimed in claim 1 wherein the second air duct extends forwardly through the cylinder plate to connect to the cylindrical opening in the cylinder plate forwardly.

* * * * *